(12) United States Patent
Hans et al.

(10) Patent No.: US 10,973,168 B2
(45) Date of Patent: Apr. 13, 2021

(54) GREEN AREA MAINTENANCE SYSTEM AND METHOD FOR IDENTIFYING AT LEAST A SECTION OF A BOUNDARY EDGE OF AN AREA TO BE TREATED

(71) Applicant: Andreas Stihl AG & Co. KG, Waiblingen (DE)

(72) Inventors: Matthias Hans, Kiefersfelden (DE); Georg Heinzelmann, Winnenden (DE); Markus Oesterle, Althuette (DE); Andreas Totschnig, St. Johann in Tirol (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 355 days.

(21) Appl. No.: 16/003,732

(22) Filed: Jun. 8, 2018

(65) Prior Publication Data

US 2018/0352731 A1 Dec. 13, 2018

(30) Foreign Application Priority Data

Jun. 9, 2017 (EP) ...................... 17175379

(51) Int. Cl.
*A01D 34/00* (2006.01)
*A01D 34/416* (2006.01)
(Continued)

(52) U.S. Cl.
CPC ......... *A01D 34/008* (2013.01); *A01D 34/412* (2013.01); *A01D 34/416* (2013.01);
(Continued)

(58) Field of Classification Search
CPC .. A01D 34/008; A01D 34/412; A01D 34/416; A01D 34/84; A01D 42/005;
(Continued)

(56) References Cited

U.S. PATENT DOCUMENTS 5,572,856 A * 11/1996 Ku .................. A01D 34/008
56/10.2 A
6,339,735 B1 * 1/2002 Peless .............. A01D 34/008
56/10.2 A
(Continued)

FOREIGN PATENT DOCUMENTS

DE 10 2013 212 605 A1 12/2014
EP 1 016 946 A1 7/2000
(Continued)

*Primary Examiner* — Alicia Torres
(74) *Attorney, Agent, or Firm* — Crowell & Moring LLP

(57) ABSTRACT

A green area maintenance system includes an autonomous mobile green area maintenance robot having a treatment tool and a cutting tool differing from the treatment tool. The robot and the cutting tool are configured to allow fixing of the cutting tool to the robot. The system includes a user control device, and has an autonomous operation mode and a cutting operation mode. In the autonomous operation mode the autonomous mobile green area maintenance robot with its treatment tool operates autonomously and the cutting tool is set out of operation, and in the cutting operation mode the cutting tool is fixed to the green area maintenance robot and operable. The robot with its treatment tool and cutting tool are controlled by a user via the user control device, and an operation mode switching device for switching between the autonomous operation mode and the cutting operation mode.

11 Claims, 2 Drawing Sheets

(51) Int. Cl.
*A01D 34/84* (2006.01)
*A01D 43/16* (2006.01)
*A01D 42/00* (2006.01)
*A01D 34/412* (2006.01)
*G05D 1/02* (2020.01)
*A01D 101/00* (2006.01)

(52) U.S. Cl.
CPC ........... *A01D 34/84* (2013.01); *A01D 42/005* (2013.01); *A01D 43/16* (2013.01); *G05D 1/0231* (2013.01); *G05D 1/0255* (2013.01); *G05D 1/0259* (2013.01); *G05D 1/0278* (2013.01); *A01D 2101/00* (2013.01)

(58) Field of Classification Search
CPC .... A01D 43/16; G05D 1/0231; G05D 1/0255; G05D 1/0259; G05D 1/0278
See application file for complete search history.

(56) References Cited

U.S. PATENT DOCUMENTS

| | | | |
|---|---|---|---|
| 7,677,344 B2* | 3/2010 | Medina | A01D 42/00 |
| | | | 180/167 |
| 7,953,526 B2* | 5/2011 | Durkos | G05D 1/0272 |
| | | | 701/25 |
| 9,241,442 B2* | 1/2016 | Diazdelcastillo | A01D 42/00 |
| 10,037,038 B2* | 7/2018 | Sandin | B60L 50/52 |
| 2014/0102061 A1 | 4/2014 | Sandin et al. | |
| 2015/0271991 A1 | 10/2015 | Balutis | |
| 2019/0041860 A1* | 2/2019 | Jones | B60L 1/02 |

FOREIGN PATENT DOCUMENTS

| | | |
|---|---|---|
| EP | 2 806 325 A2 | 11/2014 |
| EP | 2 926 642 A1 | 10/2015 |
| GB | 2517572 A | 2/2015 |
| WO | WO 2011/115536 A1 | 9/2011 |

* cited by examiner

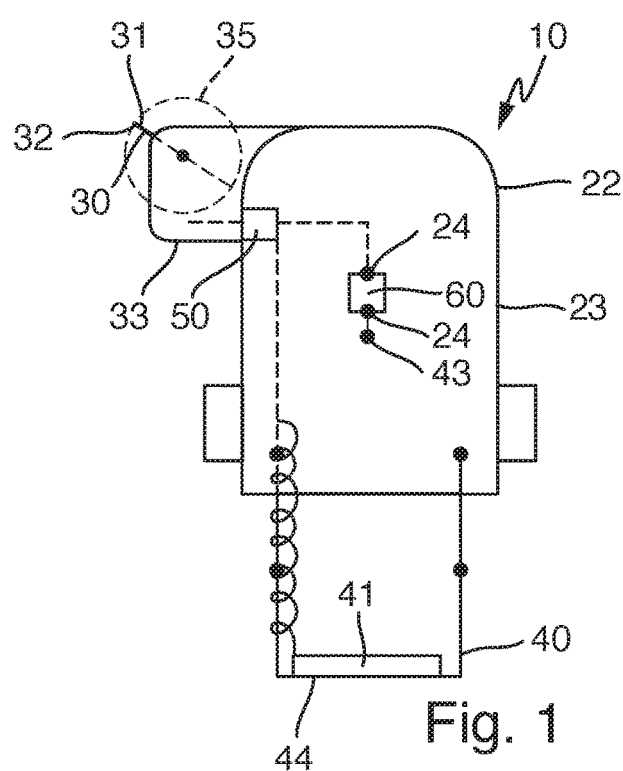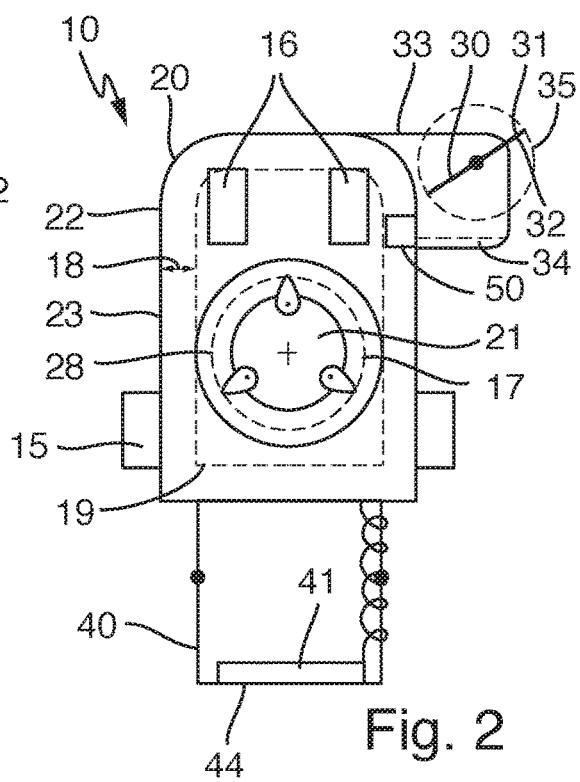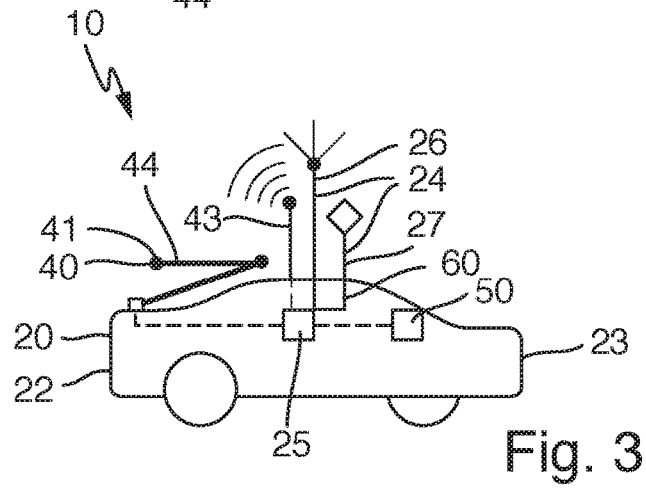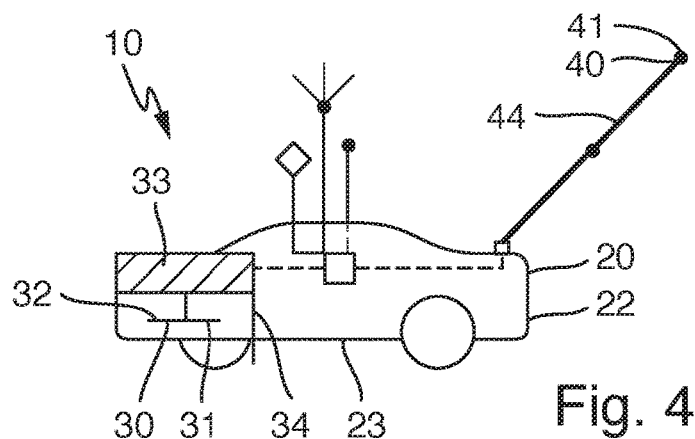

GREEN AREA MAINTENANCE SYSTEM AND METHOD FOR IDENTIFYING AT LEAST A SECTION OF A BOUNDARY EDGE OF AN AREA TO BE TREATED

CROSS REFERENCE TO RELATED APPLICATIONS

This application claims priority under 35 U.S.C. § 119 from European Patent Application No. 17 175 379.1, filed Jun. 9, 2017, the entire disclosure of which is herein expressly incorporated by reference.

BACKGROUND AND SUMMARY OF THE INVENTION

The invention relates to a green area maintenance system and to a method for identifying at least a section of a boundary edge of an area to be treated using such a green area maintenance system.

A green area maintenance system comprising a lawn mower robot is known.

The invention is based on the problem of providing a green area maintenance system which has improved properties, in particular more functions. Furthermore, the invention is based on the object of providing a method for identifying at least a section of a boundary edge of an area to be treated.

The invention solves this problem by providing a green area maintenance system and method in accordance with claimed embodiments of this invention. Advantageous developments and/or refinements of the invention are described and claimed herein.

The green area maintenance system according to the invention comprises an autonomous mobile green area maintenance robot having a treatment tool, a cutting tool differing from the treatment tool, a user control device, an autonomous operation mode and a cutting operation mode, and also an operation mode switching device. The green area maintenance robot and the cutting tool are configured to allow fixing of the cutting tool to the green area maintenance robot. In the autonomous operation mode, the autonomous mobile green area maintenance robot with its treatment tool operates autonomously and the cutting tool is set out of operation. In the cutting operation mode the cutting tool is fixed to the green area maintenance robot and operable, and the green area maintenance robot with its treatment tool and the cutting tool are controlled by a user by means of the user control device. The operation mode switching device is configured for switching, in particular for automatically switching, between the autonomous operation mode and the cutting operation mode.

Firstly, in its autonomous operation mode, the green area maintenance system permits autonomous treatment of an area to be treated by means of the autonomous mobile green area maintenance robot with its treatment tool. Secondly, in its cutting operation mode, the green area maintenance system permits at least one region of the area to be treated, in particular a border region and/or edge region, or the area to be treated to be completely treated by means of the green area maintenance robot with its treatment tool and the cutting tool. The cutting operation mode can make it possible to treat the area to be treated in a manner which may not be possible, permitted and/or permissible and/or allowed in the autonomous operation mode.

The area to be treated can be, for example, a free area, in particular unsealed soil, or a green area, such as a meadow with grass.

In particular, the cutting tool can be permanently fixed to the green area maintenance robot, in particular from the factory or after assembly by the user.

To operate autonomously can mean that the autonomous mobile green area maintenance robot can be configured to move and/or to operate on the area to be treated, which can be predetermined, and/or in its surroundings, and/or to select at least one parameter, such as, in particular, a distance parameter, and/or a reversal point, self-actingly, automatically, in a self-determined manner, in a self-controlled manner and/or independently of the user. To operate autonomously can additionally or alternatively mean that the green area maintenance robot can be configured to begin with an operation and/or to end the operation independently. In the autonomous operation mode, the green area maintenance robot does not need to be controlled, in particular remotely controlled, by the user. In other words: in the autonomous operation mode, the green area maintenance robot can operate in particular without human control and/or guidance. The autonomous mobile green area maintenance robot can be referred to as a service robot.

To be set out of operation can mean that the cutting tool does not need to be fixed to the green area maintenance robot or can be fixed to the green area maintenance robot, but then cannot operate, in particular can be deactivated, can be decoupled from a driving energy source and/or cannot be controlled or cannot be activated.

In particular, in the autonomous operation mode, the cutting tool is permanently set out of operation, in particular for the entire duration or time of the autonomous operation mode. In other words: during the, in particular entire, duration or time of the autonomous operation mode, the cutting tool can be set out of operation. Put another way: in the autonomous operation mode, the cutting tool can permanently not be operable, in particular for the entire duration or time of the autonomous operation mode.

To be controlled can mean that a movement of the autonomous mobile green area maintenance robot with the cutting tool fixed thereto, or operation of the treatment tool and/or operation of the cutting tool can be controlled. To be controlled can be referred to as to be monitored.

In particular, in the cutting operation mode, the cutting tool is fixed permanently, in particular for the entire duration or time of the cutting operation mode, to the green area maintenance robot and/or can be operable. In other words, during the, in particular entire, duration or time of the cutting operation mode, the cutting tool can be fixed to the green area maintenance robot and/or can be operable. Put another way: in the cutting operation mode, the cutting tool can permanently not be set out of operation, in particular for the entire duration or time of the cutting operation mode.

The cutting operation mode can be referred to as a controlled and/or monitored and/or manual mode and/or user mode.

In a development of the invention, the cutting tool comprises at least one cutting element. The green area maintenance system is configured such that the cutting tool in the cutting operation mode is controllable or operable or can be or is allowed to be controlled such that a maximum kinetic energy of the cutting element is greater than 10 Joules. The relatively high kinetic energy of the cutting element can make it possible to treat the area to be treated in a manner which may not be possible, permitted and/or permissible and/or allowed in the autonomous operation mode. In particular, the cutting element can be configured as a rotating cutting element. The maximum kinetic energy can be a maximum rotation energy.

In a development of the invention, the cutting tool comprises at least one mowing line, at least one plastic knife, at least one metallic knife and/or a metallic cutting blade having at least one cutting edge and/or having at least one cutting tooth. This can permit cutting of grass, herbaceous plants, woody undergrowth or smaller trees/shrubs by means of the cutting tool. The cutting tool can advantageously be configured as a rotating cutting tool and for the purpose of cutting the material to be cut by what is referred to as the free cutting method without a counter blade, in particular to produce a cutting operation by the centrifugal force of the cutting tool. In particular, the cutting tool can be referred to as a motorized scythe, brush cutter, grass trimmer and/or lawn trimmer.

In a development of the invention, the autonomous mobile green area maintenance robot is a lawn mower robot. The treatment tool is a lawn mower tool. In particular, the green area maintenance robot can be a mulch mower robot. The treatment tool can advantageously comprise at least one mowing line, at least one plastic knife, at least one metallic knife and/or a metallic cutting blade having at least one cutting edge and/or having at least one cutting tooth.

In a development of the invention, the autonomous mobile green area maintenance robot has a protective housing which is open, in particular at the bottom, with a lateral rim. The treatment tool defines a treatment zone and is arranged within the protective housing such that the treatment zone is located, in particular completely, in a safety zone of the protective housing. The safety zone has a safety distance, in particular a minimum safety distance, to the lateral rim. The protective housing and/or the safety distance can ensure that, upon contact of the green area maintenance robot with a human and/or an animal, said human or animal cannot come readily into contact with the treatment tool arranged in the safety zone. This can enable, permit and/or allow the autonomous operation mode of the autonomous mobile green area maintenance robot with its treatment tool. The protective housing can be referred to as a treatment tool cover. Open can mean that treatment of the area to be treated by means of the treatment tool can be possible. The safety distance can advantageously be at least 4 centimeters (cm), in particular at least 8 cm, advantageously at least 15 cm.

Additionally or alternatively, the autonomous mobile green area maintenance robot can have at least one lifting and/or tilting sensor, wherein the lifting and/or tilting sensor can be configured to sense a lifting and/or a tilting of the green area maintenance robot. The green area maintenance robot can be configured to set the treatment tool out of operation depending on a sensed lifting and/or tilting.

Further additionally or alternatively, the autonomous mobile green area maintenance robot can have at least one obstacle sensor, wherein the obstacle sensor can be designed to sense an obstacle. The green area maintenance robot can be configured to set the treatment tool out of operation depending on a sensed obstacle. For example, the obstacle can be a person and/or an animal.

Further additionally or alternatively, the autonomous mobile green area maintenance robot and/or its treatment tool can be configured in such a manner that the treatment tool takes an evasive action upon contact with an obstacle.

In a refinement of the invention, the cutting tool defines a cutting zone. In the cutting operation mode, the cutting tool is fixed to and/or arranged on the autonomous mobile green area maintenance robot such that the cutting zone is located at least partially, in particular completely, beyond the safety zone. This can enable cutting of a border region of the area to be treated, in particular a lawn border and/or a lawn edge, by means of the cutting tool. The cutting zone can be defined by one end of the cutting tool.

In a development of the invention, the green area maintenance system includes a cutting tool attachment part. The cutting tool attachment part comprises the cutting tool. The autonomous mobile green area maintenance robot and the cutting tool attachment part are configured to allow removable fixing of the cutting tool attachment part on the green area maintenance robot, in particular for the re-releasable, non-destructive and/or tool-free fixing. The cutting tool attachment part can be referred to as an add-on cutting tool attachment part.

In a refinement of the invention, the operation mode switching device is configured to detect fixation of the cutting tool attachment part on the autonomous mobile green area maintenance robot and, in particular as a result thereof, to switch the green area maintenance system over to the cutting operation mode. Additionally or alternatively, the operation mode switching device is configured to detect a removal or a release of the cutting tool attachment part from the green area maintenance robot and, in particular as a result thereof, to switch the green area maintenance system over to the autonomous operation mode. In particular, the green area maintenance system can be configured to only be in the cutting operation mode when the cutting tool is fixed to the autonomous mobile green area maintenance robot. In particular, switching over to the autonomous operation mode can be blocked.

In a development of the invention, the user control device comprises a wired remote control. The wired remote control is configured to wired control connection to the autonomous mobile green area maintenance robot and/or to the cutting tool and/or to the cutting tool attachment part, if present. Additionally or alternatively, the user control device comprises an, in particular wireless, remote control transmitter. The autonomous mobile green area maintenance robot and/ or the cutting tool and/or the cutting tool attachment part, if present, comprise/comprises an, in particular wireless, remote control receiver. The remote control transmitter and the remote control receiver are configured to wireless and/or cable-free control connection, in particular to a radio connection. The user control device or its wireless remote control can be referred to as a control console. The user control device or its wired remote control transmitter can comprise or be a cell phone, in particular a smartphone, and/or a tablet. In particular, the wireless control connection can be directly between the remote control transmitter and the remote control receiver or indirectly via, for example, a base station for the autonomous mobile green area maintenance robot. The autonomous mobile green area maintenance robot and the cutting tool or the cutting tool attachment part, if present, can advantageously be configured to a control connection.

In a refinement of the invention, the wired remote control is movable, in particular adjustable, between a control position and a storage position. The operation mode switching device is configured to detect the control position and, in particular as a result thereof, to switch the green area maintenance system over to the cutting operation mode, and/or to detect the storage position and, in particular as a consequence thereof, to switch the green area maintenance system over to the autonomous operation mode. Additionally or alternatively, the operation mode switching device is configured to detect an interruption of the wireless control connection and, in particular as a result thereof, to switch the green area maintenance system over to the autonomous operation mode. In particular, the wired remote control can be accommodated in the autonomous mobile green area maintenance robot in the storage position and can be taken out or removed in the control position. Additionally or alternatively, the green area maintenance system can comprise a push rod which is fixable to the green area maintenance robot and/or is adjustable, a push handle, a guide strut and/or a hand guide, and the wired remote control can be fixed thereto and/or arranged thereon in the storage position and/or in the control position. The operation mode switching device can be configured to detect a fixing and/or an adjustment.

In a development of the invention, the green area maintenance system includes a position determination device for determining of position coordinates. The position determination device is fixed to the autonomous mobile green area maintenance robot and/or to the cutting tool, and/or to the cutting tool attachment part, if present. The green area maintenance system includes a position recording device. The position recording device is configured to record and/or to store a sequence of position coordinates of the boundary edge of an area to be treated, while the green area maintenance robot and the cutting tool fixed to the green area maintenance robot in the cutting operation mode are controlled and/or guided along, in particular at least a section, of a boundary edge of the surface to be treated, in particular by the green area maintenance robot. This can enable identifying, in particular of the at least one section, of the boundary edge of the area to be treated.

In a refinement of the invention, the autonomous mobile green area maintenance robot comprises the position determination device. The green area maintenance system includes a control unit. The control unit is configured to control a movement of the green area maintenance robot in the autonomous operation mode on the area to be treated as a function of the recorded sequence of position coordinates, in particular at least of the section, of the boundary edge such that the green area maintenance robot remains on the area to be treated, in particular within the boundary edge.

In a refinement of the invention, the position determination device comprises a satellite position determination receiver for determining of position coordinates. Additionally or alternatively, the position determination device comprises a local positioning system device for determining of position coordinates. The satellite position determination receiver can advantageously be configured for one or more satellite position determination systems, such as NAVSTAR GPS, GLONASS, Galileo and/or BeiDou. Advantageously the local positioning system device can be based on one or more different technologies, such as distance measurements to junction points, optical signals, radio waves, magnetic fields, acoustic signals, ultra broadband, Bluetooth, WLAN, ultrasound and/or RFID. In particular, the local positioning system device can be a transmitter and/or a receiver. Additionally or alternatively, the local positioning system device can be an active element and/or a passive element.

Furthermore, the invention relates to a method for identifying at least the section of a boundary edge of the area to be treated, in particular by the autonomous mobile green area maintenance robot, using the previously described green area maintenance system with the position determination device and the position recording device. The method according to the invention comprises the steps: a) controlling and/or guiding the autonomous mobile green area maintenance robot having its treatment tool and the cutting tool fixed to the green area maintenance robot in the cutting operation mode along the section, in particular by means of the user control device by the user, b) determining of position coordinates using the position determination device during the controlling procedure, and c) recording the sequence of position coordinates, in particular at least of the section, of the boundary edge using the position recording device. This can make it possible for, firstly, the sequence of position coordinates at least of the section of the boundary edge of the area to be treated to be able to be identified and, secondly, for at least the section to be able to be treated. In particular, step c) can be carried out at the same time as steps a) and b) and/or after said step.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a top view of a green area maintenance system according to an embodiment of the invention.

FIG. 2 shows a bottom view of the green area maintenance system of FIG. 1.

FIG. 3 shows a side view of the green area maintenance system of FIG. 1 with a wired remote control in a storage position.

FIG. 4 shows a further side view of the green area maintenance system of FIG. 1 with the wired remote control in a control position.

DETAILED DESCRIPTION OF THE DRAWINGS

Figure 6:
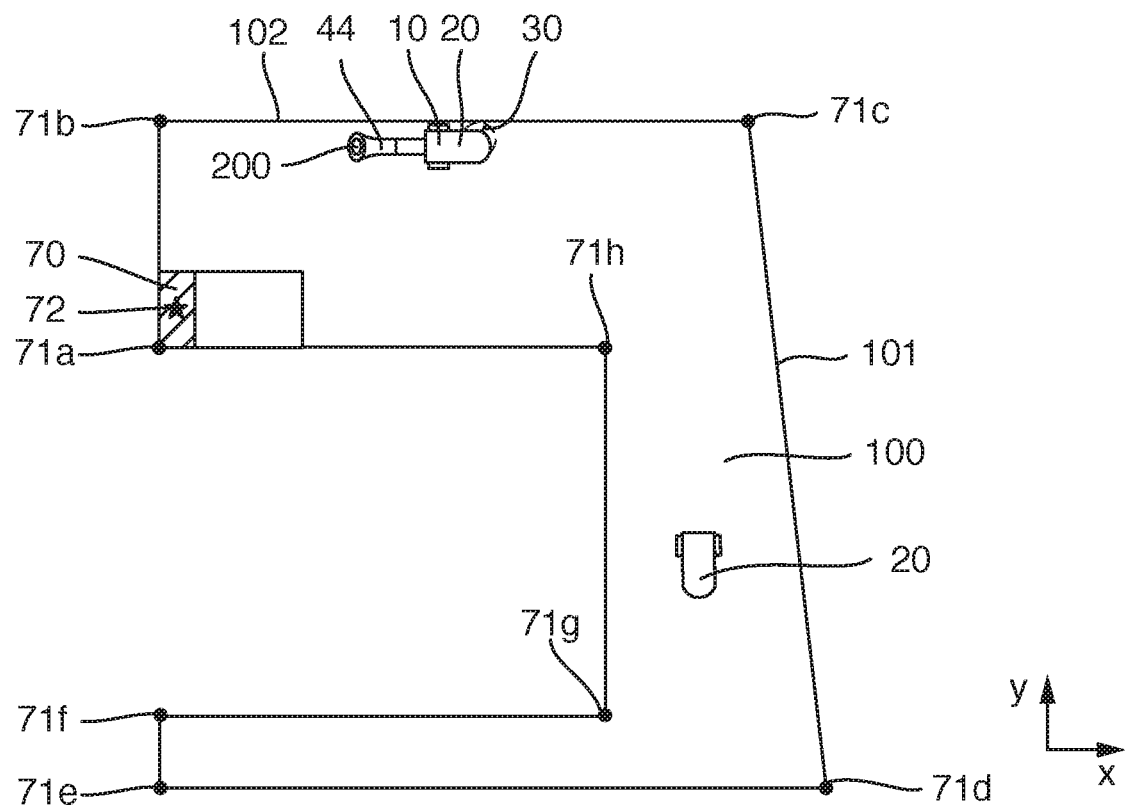
FIG. 6 shows a top view of an area to be treated by means of the green area maintenance system of FIG. 1.

FIGS. 1 to 6 show a green area maintenance system 10. The green area maintenance system 10 has an autonomous mobile green area maintenance robot 20 having a treatment tool 21, a cutting tool 30 differing from the treatment tool 21, a user control device 40, an autonomous operation mode and a cutting operation mode, and also an operating mode switching device 50. The green area maintenance robot 20 and the cutting tool 30 are configured for fixing the cutting tool 30 to the green area maintenance robot 20. In FIGS. 1 to 5 and 6 at the top, the cutting tool 30 is fixed to the green area maintenance robot 20. In the autonomous operation mode, the autonomous mobile green area maintenance robot 20 with its treatment tool 21 operates autonomously and the cutting tool 30 is set out of operation; in particular, the cutting tool 30 is not fixed to the green area maintenance robot 20, as can be seen at the bottom in FIG. 6. In the cutting operation mode, the cutting tool 30 is fixed to the green area maintenance robot 20 and is operable, and the green area maintenance robot 20 with its treatment tool 21 and the cutting tool 30 are controlled by a user 200 by means of the user control device 40, as can be seen at the top in FIG. 6. The operation mode switching device 50 is configured for switching, in particular for automatically switching, between the autonomous operation mode and the cutting operation mode.

In detail, the autonomous mobile green area maintenance robot 20 is a lawn mower robot, in particular a mulch mower robot. The treatment tool 21 is a lawn mower tool. In the exemplary embodiment shown, the treatment tool 21 comprises a metallic cutting blade with three cutting teeth. In alternative exemplary embodiments, the treatment tool can comprise only a single cutting tooth, two or more than three cutting teeth. The treatment tool 21 is designed as a rotating treatment tool and for the purpose of treating, in the free-cutting method, an area 100 to be treated in the form of a lawn with grass, in particular for producing a cutting operation by centrifugal force of the treatment tool 21. Furthermore, the treatment tool 21 is configured in such a manner that the treatment tool 21 or its cutting teeth take(s) an evasive action upon contact with an obstacle.

The autonomous mobile green area robot 20 has a protective housing 22 which is open at the bottom in FIG. 2, with a lateral rim 23. The lateral rim 23 is an outer border of one end of a wall of the protective housing 22. The treatment tool 21 or one end or an outermost point of one of the cutting teeth defines a treatment zone 28, a circular treatment zone in the exemplary embodiment shown. The treatment tool 21 is arranged in the protective housing 22 such that the treatment zone 28 is located completely in a safety zone 19 of the protective housing 22. In the exemplary embodiment shown, the treatment tool 21 is arranged in a receiving space 17, defined by the protective housing 22, in particular a bell-shaped receiving space. The safety zone 19 has a safety distance 18 to the lateral rim 23 of at least 8 cm.

In addition, the autonomous mobile green area maintenance robot 20 has front running wheels 16 which are pivotable, and rear running wheels 15 which are driven separately from one another. The autonomous mobile green area maintenance robot 20 can therefore move and steer automatically on the area 100. Furthermore, the green area maintenance robot 20 has an electric motor (not illustrated) for driving the treatment tool 21. In alternative exemplary embodiments, the green area maintenance robot can have an internal combustion engine, in particular a petrol engine, for driving the treatment tool. In addition, the green area maintenance robot 20 has a storage battery (not illustrated) for the supply of driving energy of the rear wheels 15 and of the electric motor for driving the treatment tool 21. In alternative exemplary embodiments, the green area maintenance robot can have a fuel cell or another type of driving energy source for supplying driving energy.

Furthermore, the green area maintenance system 10 has a base station 70 for the autonomous mobile green area maintenance robot 20, said base station being arranged here on a boundary edge 101 of the area 100, as can be seen at the top on the left in FIG. 6. The boundary edge 101 bounds or defines the area 100. In the exemplary embodiment shown, the base station 70 is designed as a charging station for the recharging, in particular for the automatic recharging, of the storage battery of the green area maintenance robot 20.

In its autonomous operation mode the green area maintenance system 10 therefore permits autonomous treatment of the area 100 by means of the autonomous mobile green area maintenance robot 20 with its treatment tool 21, as can be seen at the bottom in FIG. 6.

The cutting tool 30 comprises a cutting element 31, in particular a rotating cutting element, in detail a mowing line 32 made of nylon. The green area maintenance system 10 is configured such that the cutting tool 30 in the cutting operation mode is controllable such that a maximum kinetic energy Ekin or a maximum rotational energy Erot of the cutting element 31 is greater than 10 Joules. The cutting tool 30 is therefore a rotating cutting tool and is configured to cut the area 100 or the boundary edge 101 thereof in the free-cutting method, in particular for generating a cutting operation by centrifugal force of the cutting tool 30. Furthermore, the cutting tool 30 is configured in such a manner that the cutting tool 30 or its cutting element 31 in the form of the mowing line 32 takes an evasive action upon contact with an obstacle. The cutting tool 30 of the exemplary embodiment shown can be referred to as a motorized scythe or brush cutter.

The cutting tool 30 or one end or an outermost point of the cutting element 31 or of the mowing line 32 defines a cutting zone 35, a circular cutting zone in the exemplary embodiment shown. In the cutting operation mode the cutting tool 30 is fixed to the autonomous mobile green area maintenance robot 20 in such a manner that the cutting zone 35 is located completely outside the safety zone 19. In the exemplary embodiment shown, the cutting tool 30 is laterally arranged completely outside the lateral rim 23 of the protective housing 22, as can be seen at the front on the left in FIG. 1 and at the front on the right in FIG. 2.

In its cutting operation mode the green area maintenance system 10 therefore permits cutting of the area 100 at the boundary edge 101, in particular a lawn border, by means of the cutting tool 30, as can be seen at the top in FIG. 6. Treatment of the area 100 at the boundary edge 101 by means of the treatment tool 21 both in the autonomous operation mode and in the cutting operation mode can be prevented or cannot be possible because of the arrangement of the treatment tool 21 with its treatment zone 28 in the safety zone 19 of the protective housing 22 with the safety distance 18. This may be the case in particular whenever the boundary edge 101 is defined by a border wall and/or a border fence.

In detail, the green area maintenance system 10 includes a cutting tool attachment part 33. The cutting tool attachment part 33 comprises the cutting tool 30. The autonomous mobile green area maintenance robot 20 and the cutting tool attachment part 33 are configured to allow removable fixing of the cutting tool attachment part 33 on the green area maintenance robot 20. The cutting tool attachment part 33 of the exemplary embodiment shown can be referred to as a motorized scythe attachment part or brush cutter attachment part.

Furthermore, the cutting tool attachment part 33 has an electric motor (not illustrated) for driving the cutting tool 30. In alternative exemplary embodiments, the cutting tool attachment part can have an internal combustion engine, in particular a petrol engine, for driving the cutting tool. Furthermore alternatively, the cutting tool can be driven by means of the engine for driving the treatment tool. In the exemplary embodiment shown, the storage battery (not illustrated) of the green area maintenance robot 20 serves for supplying driving energy of the electric motor for driving the cutting tool in the cutting operation mode. In alternative embodiments, the cutting tool attachment part can have a dedicated driving energy source for supplying driving energy. In addition, the cutting tool attachment part 33 has user protection 34 for protecting the user 200 from material which has been cut off and/or hurled away by the cutting tool 30.

The operation mode switching device 50 is configured to detect fixation of the cutting tool attachment part 33 on the autonomous mobile green area maintenance robot 20 and, depending thereon, to switch the green area maintenance system 10 over to the cutting operation mode. Furthermore, the operation mode switching device 50 is configured to detect a removal of the cutting tool attachment part 33 from the green area maintenance robot 20 and, depending thereon, to switch the green area maintenance system 10 over to the autonomous operation mode.

The user control device 40 comprises a wired remote control 41, as can be seen in FIGS. 1 to 4. The wired remote control 41 is configured to wired control connection to the autonomous mobile green area maintenance robot 20. In the exemplary embodiment shown, the wired remote control 41 permanently has the wired control connection to the green area maintenance robot 20. Furthermore, the wired remote control 41 is movable between a control position, as can be seen in FIGS. 1, 2 and 4, and a storage position, as can be seen in FIG. 3. Additionally or alternatively to the switching over because of the fixation of the cutting tool attachment part to the green area maintenance robot and the removal therefrom, the operation mode switching device can be configured to detect the control position and, depending thereon, to switch the green area maintenance system over to the cutting operation mode, and to detect the storage position and, depending thereon, to switch the green area maintenance system over to the autonomous operation mode. The operation mode switching device 50 and the user control device 40 or the wired remote control 41 thereof are connected to one another in terms of signals, as indicated in FIGS. 1, 3 and 4 by dashed lines. In detail, the green area maintenance system 10 comprises a sliding rod 44 which is fixed to the green area maintenance robot 20 and is adjustable between a control position and a storage position. The wired remote control 41 is fixed to the sliding rod 44. The operation mode switching device can be configured to detect an adjustment of the sliding rod.

Figure 5:
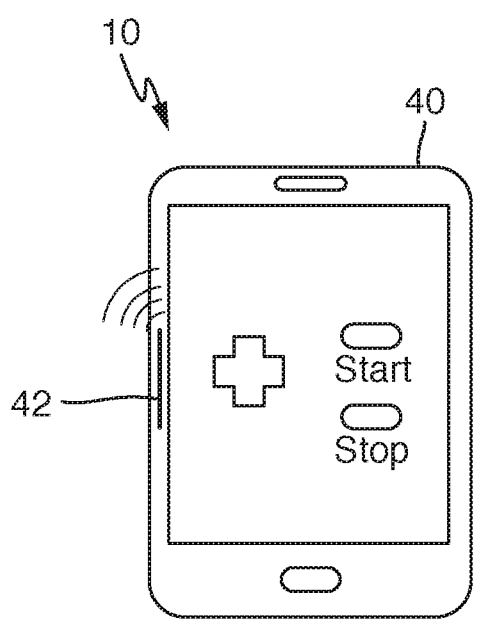
FIG. 5 shows a view of a user control device with a wireless remote control transmitter of the green area maintenance system of FIG. 1.

In addition, the user control device 40 comprises a remote control transmitter 42, as can be seen in FIG. 5. In the exemplary embodiment shown, the user control device 40 comprises a smartphone. The autonomous mobile green area maintenance robot 20 comprises a remote control receiver 43. The remote control transmitter 42 and the remote control receiver 43 are configured to wireless control connection, in particular indirectly via the base station 70. Furthermore additionally or alternatively to the switching over because of the removal of the cutting tool attachment part from the green area maintenance robot, the operation mode switching device can be configured to detect an interruption of the wireless control connection and, depending thereon, to switch the green area maintenance system over to the autonomous operation mode. The operation mode switching device 50 and the remote control receiver 43 are connected to each other in terms of signals, as indicated in FIGS. 1, 3 and 4 by dashed lines. In alternative exemplary embodiments, it may be sufficient for the user control device to comprise only the wired remote control or only the remote control transmitter.

The autonomous mobile green area maintenance robot 20 and the cutting tool 30 or the cutting tool attachment part 33 are connected to one another in terms of signals, as indicated in FIGS. 1, 3 and 4 by dashed lines.

In the cutting operation mode, the user 200 can push and steer the green area maintenance robot 20 with its treatment tool 21 and the cutting tool 30 fixed thereon in the control position by means of the sliding rod 44 and can control said robot by means of the wired remote control 41, as can be seen at the top in FIG. 6. Additionally or alternatively, the user can control the green area maintenance robot with its treatment tool and the cutting tool fixed thereon by means of the remote control transmitter 42, in particular a movement of the green area maintenance robot, operation of the treatment tool and operation of the cutting tool.

Furthermore, the green area maintenance system 10 includes a position determination device 24 for determining of position coordinates x, y. The position determination device 24 is fixed to the autonomous mobile green area maintenance robot 20. In addition, the green area maintenance system 10 includes a position recording device 60. In the exemplary embodiment shown, the green area maintenance robot 20 includes the position recording device 60. The position recording device 60 is configured to record a sequence of position coordinates x, y of a section 102 of the boundary edge 101 of an area 100, while the green area maintenance robot 20 and the cutting tool 30 fixed to the green area maintenance robot 20 in the cutting operation mode are controlled along at least the section 102 of the boundary edge 101. The position determination device 24 and the position recording device 60 are connected to each other in terms of signals, as can be seen in FIGS. 1, 3 and 4.

The green area maintenance system 10 therefore permits detection of the sequence of position coordinates x, y of at least the section 102 of the boundary edge 101 of the area 100 by means of the position determination device 24 and the position recording device 60.

Figure 7:
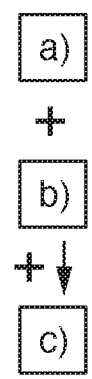
FIG. 7 shows a sequence diagram of an exemplary method according to the invention.

FIG. 7 shows a method according to the invention for identifying at least the section 102 of the boundary edge 101 of the area 100 using the previously described green area maintenance system 10 with the position determination device 24 and the position recording device 60.

In a step a), the autonomous mobile green area maintenance robot 20 having its treatment tool 21 and the cutting tool 30 fixed to the green area maintenance robot 20 in the cutting operation mode along the section 102 is controlled by the user 200 by means of the user control device 40. In a step b), position coordinates x, y are determined using the position determination device 24 during the controlling procedure. In a step c), the sequence of position coordinates x, y of at least the section 102 of the boundary edge 101 is recorded using the position recording device 60.

The method therefore firstly makes it possible to identify the sequence of position coordinates x, y of at least the section 102 of the boundary edge 101 of the area 100 by means of the position determination device 24 and the position recording device 60, as can be seen at the top in FIG. 6. Secondly, the method permits cutting of the area 100 at the boundary edge 101 by means of the cutting tool 30.

In detail, the position determination device 24 comprises a satellite position determination receiver 26 for determining of position coordinates x, y. In the exemplary embodiment shown, the base station 70 has a further satellite position determination receiver 72. The further satellite position determination receiver 72 is arranged in a stationary manner in the region of the area 100. The satellite position determination receiver 26 and the further satellite position determination receiver 72 are designed to be connected to each other in terms of signals in order to permit a relatively precise determining of the position. In addition, the position determination device 24 comprises a local positioning system device 27 for determining of position coordinates x, y. In the exemplary embodiment shown, the local positioning system device 27 is a passive element. Furthermore, the green area maintenance system 10 comprises active elements 71a, b, c, d, e, f, g, h which are arranged in corners of the area 100. The local positioning system device 27 and the active elements 71a-h are designed to interact with each other in order to permit determining of the position. In alternative exemplary embodiments, it may be sufficient for the position determination device to be able to comprise only the satellite position determination receiver or only the local positioning system device.

Furthermore, the autonomous mobile green area maintenance robot 20 comprises the position determination device 24. The green area maintenance system 10 has a control unit 25. In the exemplary embodiment shown, the green area maintenance robot 20 comprises the control unit 25. The control unit 25 is designed to control a movement of the green area maintenance robot 20 in the autonomous operation mode on the area 100 depending on the recorded sequence of position coordinates x, y of the boundary edge 101 in such a manner that the green area maintenance robot 20 remains on the area 100, in particular within the boundary edge 101, as can be seen at the bottom in FIG. 6. The position determination device 24, the position recording device 60 and the control unit 25 are connected to one another in terms of signals, as can be seen in FIGS. 1, 3 and 4. In addition, the control unit 25 and the operation mode switching device 50 are connected to each other in terms of signals, as indicated in FIGS. 1, 3 and 4 by dashed lines.

As the exemplary embodiments shown and explained above make clear, the invention provides an advantageous green area maintenance system which has improved properties, in particular more functions, and a method for identifying at least a section of a boundary edge of an area to be treated using such a green area maintenance system. In particular, the cutting operation mode can make it possible to treat the area to be treated in a manner which may not be possible, permitted and/or permissible and/or allowed in the autonomous operation mode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A green area maintenance system, comprising:
   an autonomous mobile green area maintenance robot having a treatment tool,
   a cutting tool differing from the treatment tool,
   wherein the green area maintenance robot and the cutting tool are configured to allow fixing of the cutting tool to the green area maintenance robot,
   a user control device,
   an autonomous operation mode and a cutting operation mode, wherein in the autonomous operation mode the autonomous mobile green area maintenance robot with its treatment tool operates autonomously and the cutting tool is set out of operation, and wherein in the cutting operation mode the cutting tool is fixed to the green area maintenance robot and operable, and the green area maintenance robot with its treatment tool and the cutting tool are controlled by a user via the user control device, and
   an operation mode switching device for switching between the autonomous operation mode and the cutting operation mode,
   wherein the green area maintenance system includes a cutting tool attachment part, wherein the cutting tool attachment part comprises the cutting tool, and
   wherein the autonomous mobile green area maintenance robot and the cutting tool attachment part are configured to allow removable fixing of the cutting tool attachment part on the green area maintenance robot,
   wherein the operation mode switching device is configured to:
   (i) detect fixation of the cutting tool attachment part on the autonomous mobile green area maintenance robot and to switch the green area maintenance system over to the cutting operation mode, and/or
   (ii) to detect a removal of the cutting tool attachment part from the green area maintenance robot and to switch the green area maintenance system over to the autonomous operation mode.

2. The green area maintenance system according to claim 1,
   wherein the cutting tool comprises at least one cutting element and the green area maintenance system is configured such that the cutting tool in the cutting operation mode is controllable such that a maximum kinetic energy of the cutting element is greater than 10 Joules.

3. The green area maintenance system according to claim 1,
   wherein the cutting tool comprises one or more of: a mowing line, a plastic knife, a metallic knife, or a metallic cutting blade having at least one cutting edge and/or having at least one cutting tooth.

4. The green area maintenance system according to claim 1,
   wherein the autonomous mobile green area maintenance robot is a lawn mower robot and the treatment tool is a lawn mower tool.

5. The green area maintenance system according to claim 1,
   wherein the autonomous mobile green area maintenance robot has an open protective housing with a lateral rim,
   wherein the treatment tool defines a treatment zone and is arranged within the protective housing such that the treatment zone is located in a safety zone of the protective housing, wherein the safety zone has a safety distance to the lateral rim.

6. The green area maintenance system according to claim 5,
   wherein the cutting tool defines a cutting zone, and
   wherein, in the cutting operation mode, the cutting tool is fixed to the autonomous mobile green area maintenance robot such that the cutting zone is located at least partially beyond the safety zone.

7. The green area maintenance system according to claim 1,
   wherein the user control device comprises a wired remote control, wherein the wired remote control is configured for wired control connection to the autonomous mobile green area maintenance robot and/or to the cutting tool, and/or
   wherein the user control device comprises a wireless remote control transmitter, and wherein the autonomous mobile green area maintenance robot and/or the cutting tool comprises a wireless remote control receiver, wherein the remote control transmitter and the remote control receiver are configured for wireless control connection.

8. The green area maintenance system according to claim 7,
   wherein the wired remote control is movable between a control position and a storage position, wherein the operation mode switching device is configured to detect the control position and to switch the green area maintenance system over to the cutting operation mode, and/or to detect the storage position and to switch the green area maintenance system over to the autonomous operation mode, and/or wherein the operation mode switching device is configured to detect an interruption of the wireless control connection and to switch the green area maintenance system over to the autonomous operation mode.

9. The green area maintenance system according to claim 1, wherein the green area maintenance system includes a position determination device for determining of position coordinates, wherein the position determination device is fixed to the autonomous mobile green area maintenance robot and/or to the cutting tool, and wherein the green area maintenance system includes a position recording device, wherein the position recording device is configured to record a sequence of position coordinates of a boundary edge of an area to be treated, while the green area maintenance robot and the cutting tool fixed to the green area maintenance robot in the cutting operation mode are controlled along the boundary edge.

10. The green area maintenance system according to claim 9, wherein the autonomous mobile green area maintenance robot comprises the position determination device and the green area maintenance system includes a control unit, wherein the control unit is configured to control movement of the green area maintenance robot in the autonomous operation mode on the area to be treated as a function of the recorded sequence of position coordinates of the boundary edge such that the green area maintenance robot remains on the area to be treated.

11. The green area maintenance system according to claim 9, wherein the position determination device comprises a satellite position determination receiver for determining the position coordinates, and/or wherein the position determination device comprises a local positioning system device for determining the position coordinates.

\* \* \* \* \*